Patented Nov. 28, 1950

2,531,465

UNITED STATES PATENT OFFICE 2,531,465

HALOMETHYL-4-HALOBENZANTHRONES

David I. Randall and Saul R. Buc, Easton, Pa., assignors to General Aniline & Film Corporation, New York, N. Y., a corporation of Delaware No Drawing. Application April 30, 1949, Serial No. 90,774

6 Claims. (Cl. 260—364)

This invention relates to a new process of preparing benzanthrone derivatives and to the new products obtainable thereby. More particularly it refers to the chloromethylation of 4-halobenzanthrones and the products thereof.

It has heretofore been difficult to produce halogenmethyl derivatives of benzanthrone. 4-Halobenzanthrones in particular, such as 4-bromobenzanthrone, have not been successfully chloromethylated. A method is given in French Patent No. 787,175 for preparing bromomethylbenzanthrone by the action of bromine on 2, 5, or 6-methylbenzanthrone. The starting materials for this halomethylbenzanthrone are difficult to prepare and moreover lack any great utility in the dyestuff art.

It has now been found that 4-bromo- and 4-chlorobenzanthrone can be halomethylated with almost quantitative yields of the 9-halomethyl-4-halobenzanthrone derivative in a simple and novel manner. It is surprising that 4-halobenzanthrone can be halomethylated in a simple manner and with high yields in view of the fact that benzanthrone has not been previously chloromethylated.

In our new process 4-halobenzanthrone of the formula

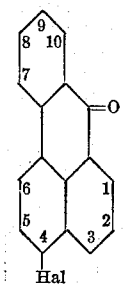

(Hal=Br or Cl)

is dissolved in a solvent for the reactants such as 96% sulfuric acid. Dihalodimethyl ether is reacted with the halobenzanthrone at an elevated temperature in the range of 30° C. to 80° C. and preferably about 60° C.

A violet red solution is obtained which is poured into ice and water, thus precipitating a bright yellow solid which is removed by filtration. The moist solid is washed free of acid and dried at 70° C. It is then crystallized from an organic solvent such as chlorobenzene. The product which is obtained in yields of over 99% has the formula

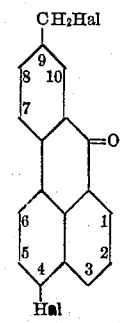

(Hal=Br or Cl)

The preferred solvent for the reactants is the concentrated sulfuric acid since it is inexpensive, catalyzes the reaction and dissolves readily the two reactants, 4-halobenzanthrone and dihalodimethyl ether. Other suitable solvents may be substituted. A dihalodimethyl ether of good purity must be used in order to insure high yields.

The following example will serve to further illustrate our invention.

Example 30.9 g. of 4-bromobenzanthrone, of theoretical bromine content, was dissolved in 230.0 cc. of 96% sulfuric acid at 30° C. To this solution 17.6 cc. of dichlorodimethylether, B. P. 104° C., was added dropwise in 35 minutes. The temperature was increased to 60° C. and held for 16 hours. The violet rod solution was poured into ice and water and the precipitated bright yellow solid was removed by filtration. The moist solid was washed free of acid and dried at 70° C. By this method 35.5 g. were obtained, which represents over 99% yield, M. P. 180–189, after crystallizing from chlorobenzene the M. P. was 204–206°.

Halogen analysis gave Br 22.2, calc. 22.1; Cl 10.0, calc. 9.9.

In another run six times as large as the above 213.0 g. of product were obtained. The entire amount was dissolved in 2130 g. of chlorobenzene. A small quantity of tar remained and was removed by filtration; it amounted to 6.0 g. The clear yellow solution was chilled to 15° C. and stirred at this temperature for several hours.

The yellow precipitate which formed was filtered off and weighed 164.0 g., M. P. 201-202° C. Removal of the solvent chlorobenzene from the filtrate gave 41.8 g. of a yellow compound of M. P. 169-180. It possessed the same properties as the higher melting fraction and by analysis its empirical formula was adduced the same as the compound melting at 201-202° C.

The reaction involved may be represented by the following structural equation:

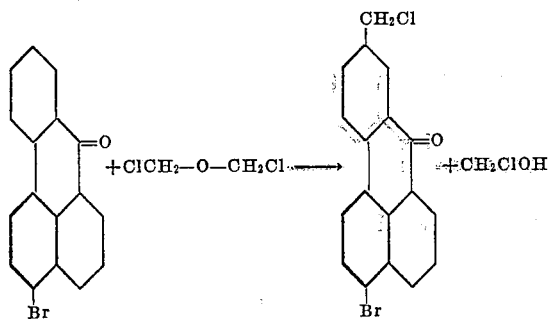

The 9-chloromethyl-4-bromobenzanthrone may be employed as an intermediate in the production of vat dyes by condensation directly with amino anthraquinones or by first reacting the benzanthrone derivative with primary aromatic amines or tertiary amines and condensing the reaction product with amino anthraquinone as more fully set forth in a co-pending application of David I. Randall (EE-498). In the case of the tertiary amines, such as pyridine, the chloromethyl group of the 9-chloromethyl-4-bromobenzanthrone reacts readily with the tertiary amine to give a water soluble quaternary derivative.

The pyridine quaternary chloride may be prepared by heating 20 grams of crude 9-chloromethyl-4-bromobenzanthrone and 250 cc. of pyridine on a steam bath at 95° C. for 1½ hours with stirring. The yellow compound which is precipitated is filtered, washed with acetone and dried. The yield is 22.5 g. The product is soluble in water with a slight greenish fluorescence and is decomposed readily by warming in aqueous base. It is a good germicide.

As indicated by the two melting points given in the example the product of the reaction may be a mixture. It may be that the chloromethyl groups on some molecules may be in positions other than the 9 position and as such the new compounds of this invention may be indicated generally as

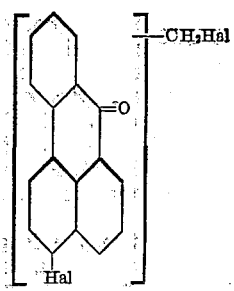

Having now particularly described our invention and set forth the best manner of performing it, what we claim as new is:

1. A halomethyl-4-halobenzanthrone having the formula:

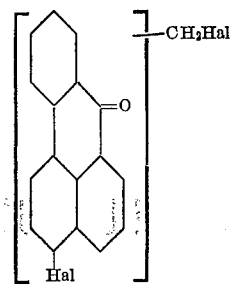

wherein Hal is a member of the group consisting of chlorine and bromine.

2. A 9-halomethyl-4-halobenzanthrone having the formula:

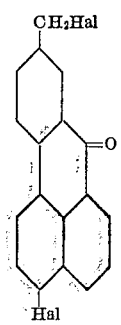

wherein Hal is a member of the group consisting of chlorine and bromine.

3. The 9-chloromethyl-4-bromobenzanthrone having the formula:

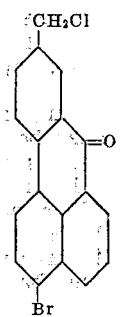

4. The process of producing a 9-halomethyl-4-halobenzanthrone which comprises reacting a 4-halobenzanthrone having the formula:

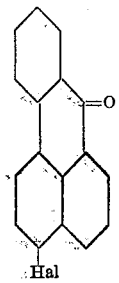

wherein Hal represents a member of the group consisting of chlorine and bromine with a dihalodimethyl ether having the formula $$Hal-CH_2-O-CH_2-Hal$$

wherein Hal has the same meaning as above, at a temperature of from 30° C. to 80° C. in a solvent for the reactants.

5. The process of producing 9-chloromethyl-4- bromobenzanthrone which comprises reacting 4-bromobenzanthrone having the formula:

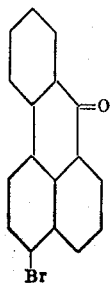

with dichlorodimethyl ether having the formula $$Cl-CH_2-O-CH_2-Cl$$

at a temperature of from 30° C. to 80° C. in a concentrated sulfuric acid solution.

6. The process of producing 9-chloromethyl-4-bromobenzanthrone which comprises reacting 4-bromo-benzanthrone with dichlorodimethyl ether at a temperature of 60° C. in a concentrated sulfuric acid solution and recovering the product by pouring into ice water and filtering.

DAVID I. RANDALL.
SAUL R. BUC.

No references cited.